United States Patent [19]

Ohta et al.

[11] 4,270,149
[45] May 26, 1981

[54] LASER BEAM FACSIMILE APPARATUS

[75] Inventors: Yoshinori Ohta; Keiichi Kubota; Mitsuhito Sakaguchi, all of Tokyo, Japan

[73] Assignee: Nippon Electric Co., Ltd., Tokyo, Japan

[21] Appl. No.: 67,788

[22] Filed: Aug. 20, 1979

[30] Foreign Application Priority Data

Aug. 21, 1978 [JP] Japan .................................. 53-102062

[51] Int. Cl.³ .............................................. H04N 1/04
[52] U.S. Cl. .................................... 358/293; 358/285
[58] Field of Search ............... 358/285, 293, 296, 298, 358/300, 289; 346/108, 76 L; 350/358

[56] References Cited

U.S. PATENT DOCUMENTS

| | | | |
|---|---|---|---|
| 3,358,081 | 12/1967 | Young et al. .......................... | 358/300 |
| 3,997,722 | 12/1976 | Bardos .................................. | 358/285 |
| 4,118,734 | 10/1978 | Bowhuis et al. ..................... | 346/76 L |
| 4,180,822 | 12/1979 | Hudson et al. ....................... | 358/293 |

Primary Examiner—Joseph A. Orsino, Jr.
Attorney, Agent, or Firm—Blakely, Sokoloff, Taylor & Zafman

[57] ABSTRACT

A laser beam facsimile apparatus is disclosed. The apparatus utilizes a slit to define the light of a scan line. A laser beam is subjected to amplitude modulation and rapidly deflected toward the slit in a sub-scanning direction by an accousto-optic modulator (AOM) cell. An aperture of the slit is selected to be larger than the diameter of the deflected beam and smaller than the deflection scan in the sub-scanning direction. The light beam passed through the slit is focused on a light-sensitive medium by an optical system, whereby the optical intensity across the entire width of the scan line is constant without losing the sharpness at the edges of the scan line.

3 Claims, 3 Drawing Figures

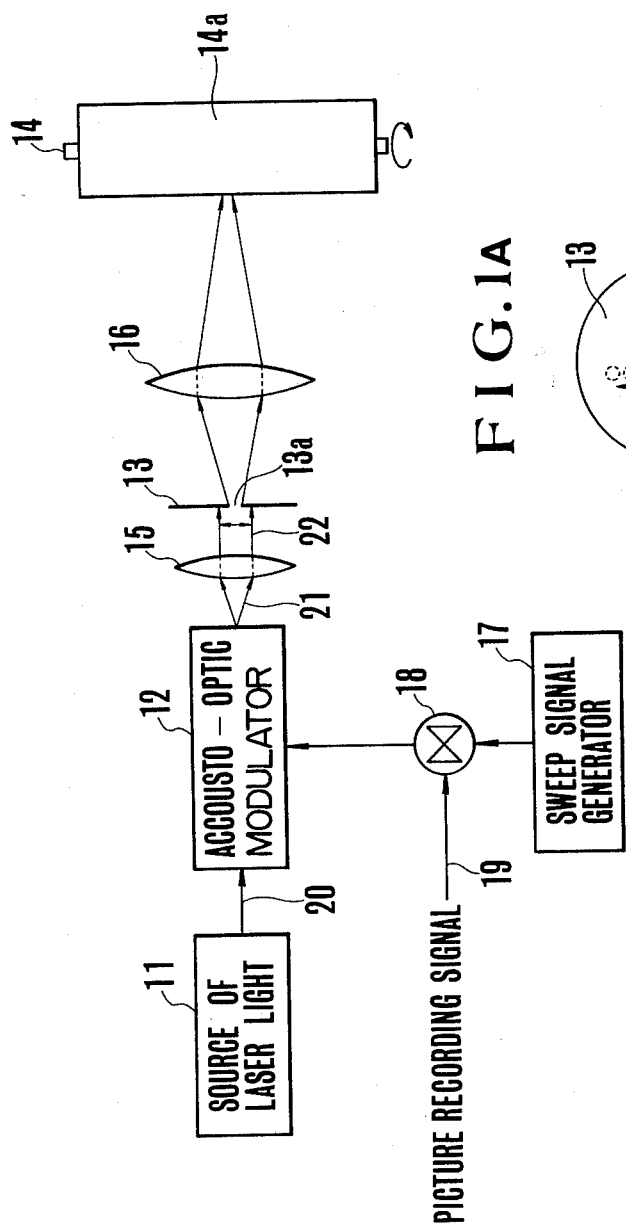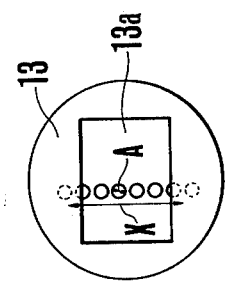

LASER BEAM FACSIMILE APPARATUS

BACKGROUND OF THE INVENTION

This invention relates to a facsimile apparatus utilizing a laser beam, and more particularly to a facsimile receiving apparatus using an accousto-optic modulator (AOM) cell.

A facsimile apparatus has been extensively improved by employing a laser source, and an optical modulator instead of a glow tube. Such laser beam facsimile apparatus has a number of advantageous features including long life of the light source, capability of high speed recording, a high utilization factor of the light and easiness of the deflection scanning of the light beam. As is well known in the prior art, facsimile recording systems are roughly classified into two systems. One of them is a system using digital binary signals to record white and black spot pictures. Another is a photograph transmission system in which analogue signals are transmitted to record half-tone images in the same manner as television signals. As a laser light is typically monochromatic, it is easy to form the small circular spot of high brightness by an optical element such as lens. This circular beam spot may be used to produce a scan line having a hight substantially equal to the diameter of the beam spot. However, when the recorded density of scan lines is made lower than the recorded density of each scan line in a direction parallel to the scan line or main-scanning direction on the recording medium as in an ordinary facsimile system, the shape of a beam spot becomes essential. If a beam spot is circular, the distance between the scan lines is larger than that of the case of using rectangular beam spot. To improve the recorded picture quality, it is required to reduce the distance between the scan lines. So long as the diameter of a recording beam is sufficiently small enough to be modulable in response to the picture signal, the quality of the recorded picture in the main-scanning direction depends on the bandwidth of a received picture signal without largely depending upon the characteristic of the optical system. On the other hand, the picture quality in a direction perpendicular to the main-scanning direction or sub-scanning direction is determined mainly by the characteristics of the recording system, particularly of the optical system. To improve the picture quality in the sub-scanning direction, it is essential that the intensity of the recorded scan line should be constant across the entire height of the scan line, in addition to higher density of the scan lines. Furthermore, it is also important to sharpen the edges of the scan line, namely to make it clear the boundary of each scan line. In order to obtain such intensity distribution at any tone not only for the digital recording system but also for the analogue recording system which requires reproduction of half tones, it is desirable that the intensity distribution of the recording beam spot in the sub-scanning direction is kept constant within the hight of the scan line and should have a rectangular form with sharp edges. To this end, it is necessary to provide a generally rectangular recording beam spot with a dimension transverse to the scan direction approximately equal to the scan spacing and the dimension along the scan direction somewhat smaller, and having the intensity distribution described above.

As one of the conventional method to obtain a rectangular recording beam spot, it has been known to employ a rectangular aperture smaller than the diameter of the irradiated light. This method is described on page 13 of a paper entitled "Fundamental and Application of Facsimiles" published in Aug. 1977 by the "Japanese Institute of Electric Communication". However, in order to make uniform the light distribution in the aperture, it is necessary to sufficiently expand the diameter of the laser beam at the aperture. This is because a laser beam has the Gaussian distribution in its crosssection. Therefore, this method the utilization factor of energy.

It has also been proposed a method wherein an acousto-optic modulator (AOM) cell is simultaneously driven with multiple frequencies to arrange multiple light beams in the sub-scanning direction. This method is described by P. A. Snopko in U.S. Pat. No. 3,935,566 issued on Jan. 27, 1976. Although in this method the utilization factor of light is high, it is necessary to provide numerous frequency sources thus complicating the circuit construction. In addition, an adjustment for making uniform the intensity of each beam causes mixed modulation of difracted lights in the AOM cell so that such adjustment is troublesome. Moreover increase in the number of the component parts decreases reliability.

Further, it has also been proposed to scan a laser beam transversely on the recording medium by sufficiently increasing the sweep frequency of the AOM cell than that of the facsimile signal. The laser beam spot has a diameter smaller than the height of the scan line. This method is described by A. M. Bardos in U.S. Pat. No. 3,997,722 issued on Dec. 13, 1976. Even with this method, however, the edge sharpness of each scan line on the recording medium has not been greatly improved. This is because the laser spot takes a functional form, that is the integral of the Gaussian function.

As is described above, each of the prior art has disadvantages. For this reason, it is difficult to employ a laser recording system in a facsimile apparatus requiring a high quality record in the sub-scanning direction, such as the receiving device of a photograph transmitting system. Even if the laser recording system is employed, it has been impossible to provide a high quality recording.

SUMMARY OF THE INVENTION

Accordingly, it is an object of this invention to provide an improved laser facsimile apparatus capable of producing records having high qualities and removing difficulties of the prior art.

Another object of this invention is to provide a laser facsimile apparatus capable of increasing the utilization factor of the light and greatly improving the uniformity of the light intensity without losing its edge sharpness.

A further object of this invention is to provide a laser facsimile apparatus whose characteristics are not affected by the variation in the ambient temperature.

The above and other beneficial objects and advantages are attained in accordance with the present invention by providing a slit into the facsimile apparatus for partially intercepting a swept light beam. The apparatus includes a light source and an optical modulator for deflecting the light and for varying the intensity of the light. The apparatus further includes a slit disposed on the exit side of the modulator. The slit has an aperture larger than a light beam deflected by the modulator. The modulator is operated so that the deflected light beam sweeps the aperture in a predetermined direction. And a light beam passed through the slit is focused on a photosensitive medium so that the light beam moves between the upper and lower limits of a recorded scan line.

BRIEF DESCRIPTION OF THE DRAWINGS

In the accompanying drawings:

FIG. 1 is a diagrammatic representation of one embodiment of this invention showing the principle thereof;

FIG. 1A is a sectional view showing the relationship between the opening of a slit and a light beam transmitting therethrough.

DESCRIPTION OF THE PREFERRED EMBODIMENTS

Figure 2:
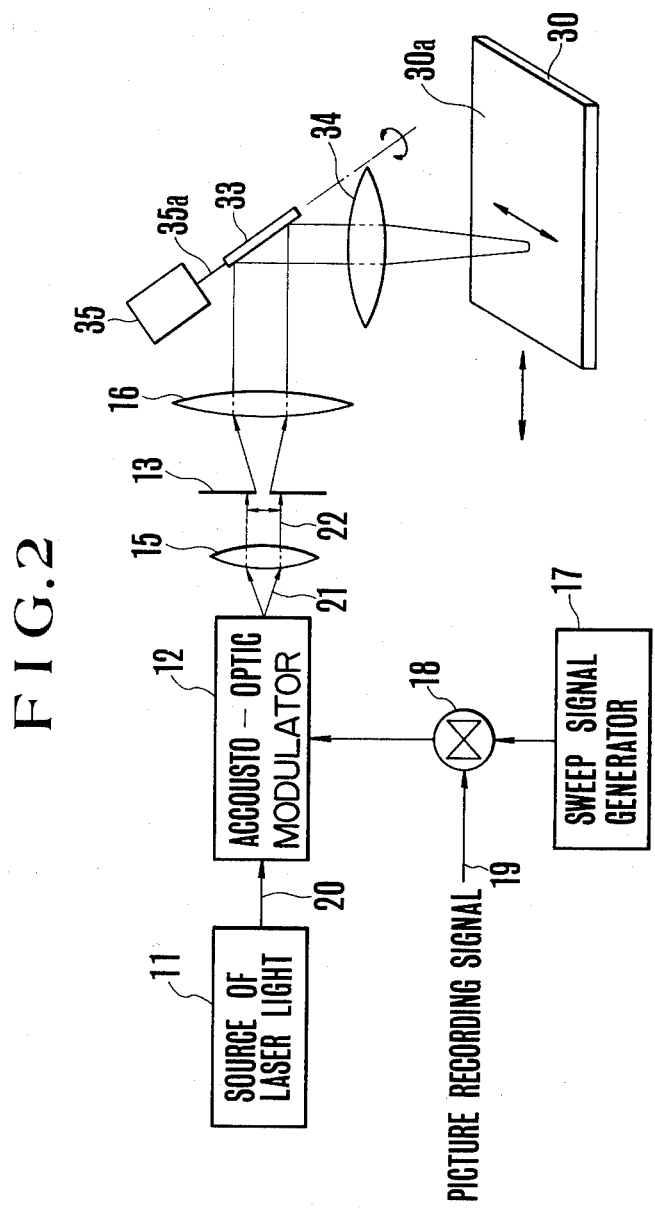
FIG. 2 is a diagrammatic representation of another embodiment of this invention.

The laser beam facsimile apparatus shown in FIG. 1 comprises a source of laser light 11, and an accoustooptic modulator (AOM) cell 12 located in front of the source of laser light 11. The function of such AOM cell is well known in the art and disclosed, for example in Fukumoto et al paper entitled "High Speed Facsimile Recording With Laser Light Sources", IEEE Transactions on Communications, Vol. COM-20, No. 1, February 1972. A slit 13 is installed on the exit side of the AOM cell 12 for intercepting a portion of a light beam deflected and modulated by the AOM cell 12. An optical system 15 is interposed between the AOM cell and the slit 13 for collimating a deflected light beam 21. A drum 14 wrapped with a photosensitive medium such as a photographic printing paper is disposed on the side of the slit 13 opposite to the AOM cell 12. Another optical system 16 is interposed between the slit 13 and the drum 14 for focusing the slit image on the drum 14. With this arrangement, two dimensional picture recording can be made with a main-scanning and a sub-scanning. The main-scanning is performed by rotating the drum 14 while the sub-scanning is performed by moving the drum 14 or a laser beam projection system in the direction of the drum axis. A sweep signal generator 17 is connected to the AOM cell 12 via an amplitude modulator 18 so that the amplitude modulator 18 modulates the output of the sweep signal generator 17 with a recording signal 19. Thus the AOM cell 12 is swept at a sufficiently higher sweep frequency than the maximum frequency of the picture recording signal 19. For instance, when the maximum frequency of the picture signal is 2 KHz, the sweep frequency amounts to higher than 10 KHz. As is described above, the amplitude of the high frequency sine wave signal generated by the sweep signal generator 17 is modulated by the picture signal 19 in the amplitude modulator 18, and the modulated signal is sent to the AOM cell 12. Thus the AOM cell 12 sweeps the emitting angle of the laser light emitted by the source of laser light 11 in one direction (in the axial direction of the drum 14) at high speed. At the same time, the AOM cell 12 modulates the intensity of the deflected light in accordance with the picture signal 19, thus emitting a recording light. The recording light is collimated by the lens 15 while at the same time, the beam diameter is reduced and then projected upon the slit 13 where the focal plane of the lens 15 is located. As shown in FIG. 1A, the aperture 13a of the slit 13 is made to be larger than the diameter A of the beam spot. And the sweep width X of the projected beam 22 is made to be larger than the aperture 13a in the sweep direction. For example, where the aperture 13a in the sweep direction is 70 microns, and where the diameter of the beam 22 at the slit portion is about 15 microns, the sweep width of the beam at this portion is selected more than 100 microns (70 microns+15 microns×2). The lens 16 has a function to reduce or enlarge the light beam passed through the aperture 13a for focusing it on the drum 14. As is described above, since the slit 13 is irradiated with a tiny light beam, which is being swept at a speed 10 times or more faster than the maximum frequency of the picture signal 19, it is recognized that the image of the slit 13 is focused on the photosensitive medium 14a in the sweep direction of the light beam 22, that is in the sub-scanning direction. Accordingly, it is possible to obtain a light distribution having sharp edges on the scan line and in which the light intensity is constant across the entire height of the scan line. Furthermore, since the light beam 22 is swept in the sub-scanning direction, the light beam 22 is intercepted for only a short time. Therefore, the loss of light is small, thus greatly improving the utilization factor of the light compared with the case of using a stationary light beam having a diameter much larger than the width of the slit. Moreover, according to this invention, even when the center of the sweeping is caused to vary by the ambient temperature variation about the AOM cell 12, or even when the center frequency of the sweep signal generator 17 is caused to vary due to the variation in the ambient temperature, the light beam passed through the slit 13 would not be affected where the beam sweep width X is made to be more or less larger than the width of the aperture 13a in the sweep direction.

FIG. 2 shows a modified embodiment of this invention, namely of a plane scanning type. In this embodiment, drum 14 shown in the first embodiment is substituted by a photosensitive medium 30a disposed on a flat plate 30 and an optical main-scanning system. The optical main-scanning includes a galvanometer mirror 33 and a lens 34 which focuses the light reflected by the mirror 33. The galvanometer mirror 33 is driven by drive member 35 which periodically rotates shaft 35a of the mirror 33 over a predetermined angle. Thus, a two dimentional picture can be achieved by the combination of the main-scanning caused by the galvanometer mirror 33 and the sub-scanning due to movement of the planar photosensitive medium in a direction perpendicular to the main-scanning direction. The lens 34 has a function to convert the linear angular deflection of the reflected light beam from the galvanometer mirror 33 into a linear positional displacement in the scanning direction on the photosensitive medium 30a. Thus, the lens 34 acts like a F$\theta$ lens. Lenses 16 and 34 are designed to focus the image of the slit 13 on the photosensitive medium 30a with arbitrary size. And the surface of the galvanometer mirror is substantially placed at a spacial frequency plane of the slit image focused on the surface of the photosensitive medium 30a. In accordance with this modification, even if the reflection area of the galvanometer mirror 33 is not large, degradation in the picture quality is much smaller than the prior art. The reason of the above feature can be described more in detail hereinafter.

A spacial rapid variation of the light distribution passed through the slits 13, namely a difraction of the light at the slit 13, results in the spreading of the light distribution on the galvanometer mirror plane. As is well known, the scanning speed of the galvanometer mirror 33 can be increased by reducing its mirror size. But the limited surface of the galvanometer mirror 33 makes it difficult to convey the total light beam to the Fθ lens 34. This means that the harmonic components of the light diffracted by the slit 13 are not transmitted perfectly. Unless the mirror 33 is enough to cover more than 10th order of the harmonic components, the focused slit image on the photosensitive medium 30a loses its sharpness at edge portions. When the slit 13 is uniformly irradiated with a stationary light having a diameter larger than the aperture 13a as in the prior art, the loss of a higher order harmonic component causes not only the blur of the image but also a ripple in the center portion of the focused image. This is because the light wave components passed through different portions of the aperture 13a interfere with each other. This spacial ripple due to interference makes optical intensity within each scan line nonuniform, and thereby causing degradation of the picture quality. On the other hand, when the small laser spot is scanned across the slit 13 as in this invention, the optical intensity ripple does not occur across the entire height of the scan line, even if the galvanometer mirror 33 is not large enough. This is because the light waves passed through different positions of the aperture 13a require different time so that they do not interfere with each other.

For this reason, the present invention facilitates to employ a slit in a plane scanning type having a main-scanning optical system without reducing a scanning velocity. In addition, the edges of each scan line are made clear without causing the optical intensity ripple within the scan line.

Thus, it will be understood that the reproduced picture the image according to the present invention is superior to any prior art.

The component elements of the optical system utilized in the embodiment may be different from those described above. For example, the galvanometer mirror 33 may be substituted by another light deflection means such a combination of an electric motor and a rotating multi-plane mirror. The Fθ lens 34 may be substituted by a Fθ mirror or an ordinary mirror, or a lens located at such position that the slit 13 is focused directly on the photosensitive medium as in the first embodiment shown in FIG. 1.

Other changes may be made in the above described apparatus without departing from the true spirit and scope of the invention herein involved and it is intended that the subject matter in the above depiction shall be interpreted as illustrative and not in a limitting sense.

What is claimed is:

1. A laser beam facsimile apparatus comprising:
   a laser light source;
   an accousto-optic modulator cell disposed on the exit side of said laser light source for deflecting a laser beam emitted from said laser light source in a sub-scanning direction;
   an optical system disposed on the exit side of said accousto-optic modulator cell for collimating said laser light beam;
   a slit disposed on the exit side of said optical system and having an aperture larger than the diameter of the light beam deflected by said modulator cell in a predetermined direction;
   an optical system for focusing a light beam passed through said aperture on a photosensitive medium;
   means for scanning said deflected light beam on said photosensitive medium to produce a pattern of scan lines on said photosensitive medium;
   a sweep signal generator connected to said modulator cell for scanning a light beam across said slit so that the deflected light beam runs over said aperture; and
   said sweep signal having a frequency sufficiently higher than the maximum frequency of a signal for producing said scan lines.

2. A light beam facsimile apparatus according to claim 1, wherein said scanning means is a drum scanning type.

3. A light beam facsimile apparatus according to claim 1, wherein said scanning means is a plane scanning type.

* * * * *